US010919790B2

(12) United States Patent
Okino et al.

(10) Patent No.: US 10,919,790 B2
(45) Date of Patent: Feb. 16, 2021

(54) METHOD FOR REMOVING SELENIUM AND APPARATUS FOR REMOVING SELENIUM

(71) Applicant: MITSUBISHI HITACHI POWER SYSTEMS ENVIRONMENTAL SOLUTIONS, LTD., Kanagawa (JP)

(72) Inventors: Susumu Okino, Tokyo (JP); Kazuhide Kamimura, Hyogo (JP); Tetsuya Ito, Hyogo (JP); Morikata Nishida, Hyogo (JP); Hiroyuki Nakamura, Hyogo (JP)

(73) Assignee: MITSUBISHI POWER ENVIRONMENTAL SOLUTIONS, LTD., Kanagawa (JP)

( * ) Notice: Subject to any disclaimer, the term of this patent is extended or adjusted under 35 U.S.C. 154(b) by 404 days.

(21) Appl. No.: 14/894,991

(22) PCT Filed: Jun. 28, 2013

(86) PCT No.: PCT/JP2013/067843
§ 371 (c)(1),
(2) Date: Nov. 30, 2015

(87) PCT Pub. No.: WO2014/207905
PCT Pub. Date: Dec. 31, 2014

(65) Prior Publication Data
US 2016/0115053 A1  Apr. 28, 2016

(51) Int. Cl.
*C02F 1/56* (2006.01)
*C02F 1/72* (2006.01)
*C02F 9/00* (2006.01)
*C02F 1/52* (2006.01)
*C02F 101/10* (2006.01)
*C02F 1/78* (2006.01)
*C02F 103/18* (2006.01)
*C02F 1/76* (2006.01)
*C02F 103/36* (2006.01)

(52) U.S. Cl.
CPC ............ *C02F 1/722* (2013.01); *C02F 1/5236* (2013.01); *C02F 1/5245* (2013.01); *C02F 1/56* (2013.01); *C02F 9/00* (2013.01); *C02F 1/76* (2013.01); *C02F 1/78* (2013.01); *C02F 2101/106* (2013.01); *C02F 2103/18* (2013.01); *C02F 2103/365* (2013.01); *C02F 2209/04* (2013.01); *C02F 2305/02* (2013.01); *C10J 2300/093* (2013.01); *C10J 2300/169* (2013.01); *C10J 2300/1643* (2013.01); *Y02E 20/16* (2013.01); *Y02E 20/18* (2013.01)

(58) Field of Classification Search
CPC .................................................. C02F 1/5236
See application file for complete search history.

(56) References Cited

U.S. PATENT DOCUMENTS

| 6,214,238 B1* | 4/2001 | Gallup | C02F 1/5236 |
|---|---|---|---|
| | | | 210/717 |
| 2003/0132166 A1* | 7/2003 | Rey | C02F 9/00 |
| | | | 210/696 |
| 2011/0203993 A1* | 8/2011 | Hughes | C02F 9/00 |
| | | | 210/638 |
| 2011/0220583 A1* | 9/2011 | Schwarz | C02F 1/5236 |
| | | | 210/719 |

FOREIGN PATENT DOCUMENTS

| CN | 1070168 A | 3/1993 |
|---|---|---|
| JP | 9-47790 A | 2/1997 |
| JP | 11-158681 A | 6/1999 |
| JP | 2001-520119 A | 10/2001 |
| JP | 3385137 B | 3/2003 |
| JP | 2003-251367 A | 9/2003 |
| JP | 2005-224771 A | 8/2005 |
| JP | 2005-279409 A | 10/2005 |
| JP | 2006-136843 A | 6/2006 |
| JP | 2006-205097 A | 8/2006 |
| JP | 2008-188536 A | 8/2008 |
| JP | 2011-72940 A | 4/2011 |
| JP | 2011-200848 A | 10/2011 |
| JP | 4970972 B2 | 7/2012 |
| JP | 2013-522008 A | 6/2013 |

OTHER PUBLICATIONS

Office Action in CN Application No. 201380076750.0, dated Jul. 6, 2016.
Office Action in KR Application No. 10-2015-7033337, dated Feb. 1, 2017.
International Search Report dated Aug. 20, 2013, corresponding to International application No. PCT/JP2013/067843.
Written Opinion of the International Searching Authority dated Aug. 20, 2013, corresponding to International application No. PCT/JP2013/067843.
Decision to Grant a Patent dated Jul. 1, 2014, corresponding to Japanese Patent Application No. 2014-502910.

* cited by examiner

*Primary Examiner* — Peter Keyworth
(74) *Attorney, Agent, or Firm* — Kanesaka Berner and Partners LLP

(57) ABSTRACT

A method for removing selenium according to the present invention comprises: a valence change step of adding an oxidant to a wastewater from a facility that gasifies a fuel containing selenium in a reducing atmosphere, and oxidizing the selenium to change the valence of the selenium, and a solid-liquid separation step of adding a flocculant to the wastewater, forming a floc containing the selenium for which the valence has been changed in the valence change step, and subjecting the floc to solid-liquid separation.

2 Claims, No Drawings

US 10,919,790 B2

METHOD FOR REMOVING SELENIUM AND APPARATUS FOR REMOVING SELENIUM

RELATED APPLICATIONS

The present application is a National Phase of International Application Number PCT/JP2013/067843, filed Jun. 28, 2013

TECHNICAL FIELD

The present invention relates to a method for removing selenium and an apparatus for removing selenium, used for removing selenium from the wastewater from a coal gasification power generation facility.

BACKGROUND ART

One method of generating power using coal as a fuel is coal-fired thermal power generation. In coal-fired thermal power generation, the coal is combusted in an oxidizing atmosphere, and the steam or the like that is generated by the heat of combustion is used to generate electrical power.

The coal used as fuel contains trace amounts of toxic substances such as fluorine and selenium. As a result, the wastewater produced in a facility that generates power through the combustion of coal also contains these toxic substances. The amounts of these toxic substances vary considerably depending on factors such as the production source for the coal. Depending on the type of coal that is used, the concentration of toxic substances such as fluorine and selenium in the wastewater may exceed the discharge standards based on the Water Pollution Control Act. Wastewater that contains toxic substances in such concentrations must be treated to appropriately remove the toxic substances before the wastewater is discharged into public waterways such as rivers or the sea (PTL1 and PTL2).

PTL1 and PTL2 disclose methods for removing selenium contained in wastewater.

In a wastewater generated from a coal-fired thermal power generation facility, selenium is frequently dissolved in the water in an ionic state composed of positive tetravalent selenium (selenite ions/$SeO_3^{2-}$) or positive hexavalent selenium (selenate ions/$SeO_4^{2-}$). Positive tetravalent selenium can be removed from the wastewater comparatively easily by flocculation-settling using an iron compound such as ferric chloride.

Positive hexavalent selenium is difficult to reduce, and does not form a substantially insoluble metal salt with iron or the like. Accordingly, positive hexavalent selenium is difficult to remove from the wastewater using solid-liquid separation treatments such as flocculation-settling or membrane separation. One known method for removing positive hexavalent selenium involves first reducing the positive hexavalent selenium to positive tetravalent selenium, and then removing the reduced positive tetravalent selenium from the wastewater by flocculation-settling.

PTL1 discloses a method in which by bringing at least one type of metal selected from among Fe, Mn, Ni and Cu into contact with the wastewater, positive hexavalent selenium is reduced to positive tetravalent selenium, thus enabling the selenium to be removed. PTL2 discloses a method in which positive hexavalent selenium is reduced to positive tetravalent selenium by a biological reaction, thus enabling the selenium to be removed.

CITATION LIST

Patent Literature

{PTL 1} Japanese Unexamined Patent Application, Publication No. Hei 09-47790
{PTL 2} Japanese Unexamined Patent Application, Publication No. 2006-205097

SUMMARY OF INVENTION

Technical Problem

In recent years, in order to enhance the power generation efficiency of power generation using coal as a fuel, coal gasification power generation has been developed. Coal gasification power generation is a method in which the coal is steam baked under low-oxygen conditions to cause a thermal decomposition reaction that generates a fuel gas, and this fuel gas is then used for generating power. The main components of this fuel gas are hydrogen and carbon monoxide.

In coal gasification power generation, in a similar manner to that described above, because coal is used as a fuel, the wastewater contains selenium in an amount that varies depending on the type of coal used. Accordingly, selenium must be removed from the wastewater in a similar manner to that required in coal-fired thermal power generation.

The inventors of the present invention attempted to use conventional methods to remove selenium from a selenium-containing wastewater generated by a coal gasification power generation facility. In other words, an attempt was made to reduce the selenium within the selenium-containing wastewater to positive tetravalent selenium, and then separate the selenium using a solid-liquid separation technique such as flocculation-settling or membrane separation. However, the selenium concentration within the wastewater could not be reduced to a level lower than the discharge standard based on the Water Pollution Control Act.

The present invention has been developed in light of the above circumstances, and has an object of providing a method for removing selenium and an apparatus for removing selenium, which enable the separation and removal of selenium from a selenium-containing wastewater generated in a coal gasification power generation facility.

Solution to Problem

As a result of intensive research, the inventors of the present invention made the following findings.

In coal-fired thermal power generation, because the coal is combusted in an oxidizing atmosphere, the selenium contained in the wastewater exists as positive tetravalent selenium or positive hexavalent selenium. However, in coal gasification power generation, because the coal is gasified in a reducing atmosphere, the selenium exists in the wastewater in an ionic state having a valence lower than +4.

In other words, the ionic state of the selenium contained in the wastewater differs for coal-fired power generation and coal gasification power generation. As a result, conventional methods used for removing selenium from the wastewater from coal-fired power generation cannot be applied to the wastewater from coal gasification power generation.

In coal-fired power generation, the existence of ionized selenium having a valence lower than +4 in the wastewater is unknown, and no treatment method has been developed for such selenium. Ionized selenium having a valence lower than +4 is difficult to remove by solid-liquid separation treatments such as flocculation-settling, and can also not be removed by reduction and subsequent flocculation-settling in a similar manner to positive hexavalent selenium.

Based on the above findings, the method for removing selenium and the apparatus for removing selenium according to the present invention adopt the aspects described below.

In other words, a method for removing selenium according to the present invention is a method for removing selenium from a wastewater from a facility that gasifies a fuel containing selenium in a reducing atmosphere, the method comprising a valence change step of adding an oxidant to the wastewater containing selenium and oxidizing the selenium to change the valence of the selenium, and a solid-liquid separation step of adding a flocculant to the wastewater, forming a floc containing the selenium for which the valence has been changed in the valence change step, and subjecting the floc to solid-liquid separation.

Further, an apparatus for removing selenium according to the present invention is an apparatus for removing selenium from a wastewater from a facility that gasifies a fuel containing selenium in a reducing atmosphere, the apparatus comprising a valence change unit which adds an oxidant to the wastewater containing selenium and oxidizes the selenium to change the valence of the selenium, and a solid-liquid separation unit which adds a flocculant to the wastewater, forms a floc containing the selenium for which the valence has been changed in the valence change unit, and subjects the floc to solid-liquid separation.

In the wastewater from a facility that gasifies a fuel containing selenium in a reducing atmosphere, the majority of the selenium exists in a state having a valence lower than positive tetravalent selenium. Examples of selenium having a valence lower than positive tetravalent selenium include positive or negative divalent selenium and zero-valent selenium. Ionized selenium having a valence lower than +4 is difficult to remove from wastewater by flocculation-settling treatment.

In the present invention, the selenium having a valence lower than positive tetravalent selenium is first oxidized to form positive tetravalent selenium. Positive tetravalent selenium can be removed easily from the wastewater by a flocculation-settling treatment using a flocculant. As a result, the selenium concentration in the wastewater can be reduced to a level lower than the discharge standard based on the Water Pollution Control Act.

In one aspect of the invention described above, an iron salt is preferably added to the wastewater in the valence change step.

In one aspect of the invention described above, the valence change unit preferably includes an iron salt addition section which adds an iron salt to the wastewater.

By adding an iron salt to the wastewater in combination with the oxidant, the selenium concentration contained within the wastewater can be further reduced.

In one aspect of the invention described above, in the valence change step, the oxidation-reduction potential of the wastewater is controlled to a value within a prescribed range.

The oxidation-reduction potential (ORP) describes the equilibrium electrode potential of an oxidation-reduction electrode, and is an indicator for ascertaining the strength of the oxidizing power or reducing power of a solution. A larger value for the oxidation-reduction potential indicates a stronger oxidizing tendency for the solution. By controlling the oxidation-reduction potential of the wastewater to achieve a solution with an oxidizing tendency, the selenium contained within the wastewater can be more easily oxidized. As a result, the selenium can be oxidized more efficiently.

In one aspect of the invention described above, the oxidant is preferably at least one compound selected from among hydrogen peroxide, sodium hypochlorite and ozone.

Hydrogen peroxide increases the oxidation-reduction potential of the wastewater gradually in accordance with the amount of hydrogen peroxide added. Accordingly, when hydrogen peroxide is used as the oxidant, the amount added of the oxidant can be set with no concern that the oxidation-reduction potential of the wastewater may become too large.

Sodium hypochlorite can increase the oxidation-reduction potential of the wastewater significantly in accordance with the amount of sodium hypochlorite added. Accordingly, when sodium hypochlorite is used as the oxidant, a wastewater having a strong oxidizing tendency can be prepared with an oxidation-reduction potential within the ideal range for the wastewater. As a result, the selenium oxidation reaction can be accelerated, and the time and number of steps required for removing the selenium can be reduced.

In one aspect of the invention described above, the flocculant is preferably an inorganic flocculant, or a combination of an inorganic flocculant and a polymer flocculant.

By adding an inorganic flocculant to the wastewater that has been subjected to the valence change step, a floc containing positive tetravalent selenium can be formed. This floc can be removed easily from the wastewater by solid-liquid separation. There is a possibility that zero-valent selenium that has not been oxidized to the +4 valence may also exist in the wastewater that has been subjected to the valence change step. By using a combination of an inorganic flocculant and a polymer flocculant, both the positive tetravalent selenium and the zero-valent selenium can be removed from the wastewater.

A coal gasification power generation facility comprising a selenium removal apparatus which removes selenium from the wastewater using the type of method described above can reduce the selenium concentration in the wastewater to a level that is lower than the discharge standard.

Advantageous Effects of Invention

By using the method for removing selenium and the apparatus for removing selenium according to the present invention, selenium contained in a wastewater can be oxidized and changed to positive tetravalent selenium or zero-valent selenium, thereby enabling the selenium to be easily removed by a solid-liquid separation treatment such as flocculation-settling. As a result, the selenium concentration of a wastewater generated in a coal gasification power generation facility can be reduced to a level lower than the discharge standard.

DESCRIPTION OF EMBODIMENTS

Embodiments of the method for removing selenium and the apparatus for removing selenium according to the present invention are described below.

The apparatus for removing selenium according to the present embodiment is incorporated as part of a wastewater treatment mechanism of a coal gasification power generation facility. The apparatus for removing selenium comprises a valence change unit and a solid-liquid separation unit. The apparatus for removing selenium can remove selenium from the wastewater from the coal gasification power generation facility.

The valence change unit has an oxidant addition section and an iron salt addition section. The oxidant addition section is able to add an oxidant to the selenium-containing wastewater, so as to oxidize the selenium contained within the wastewater, thereby changing the valence of the selenium. The iron salt addition section can add an iron salt to the selenium-containing wastewater. The iron salt is typically ferric chloride or ferrous sulfate or the like. In the present embodiment, ferric chloride is used as the iron salt. The iron salt addition section preferably includes a pH adjustment device that can adjust the pH of the wastewater.

The solid-liquid separation unit is provided at a subsequent stage to the valence change unit. The solid-liquid separation unit includes a flocculant addition device which can add a flocculant to the wastewater that has passed through the valence change unit. The solid-liquid separation unit preferably includes a plurality of flocculant addition devices so that different flocculants can be added to the wastewater at arbitrary times.

Next is a description of the method for removing selenium according to the present embodiment. The method for removing selenium according to the present embodiment comprises a valence change step and a solid-liquid separation step.

In the present embodiment, the wastewater that represents the treatment target of the selenium removal is deemed to be the wastewater from a facility that gasifies a fuel containing selenium in a reducing atmosphere. An example of the fuel containing selenium is coal. The facility that gasifies a fuel in a reducing atmosphere refers, for example, to the gasification furnace of a coal gasification integrated power generation facility (also known as an integrated gasification combined cycle (IGCC) facility). The selenium which has passed through the gasification furnace and accumulated in the water exists in the wastewater mainly as selenium compound ions having a valence lower than positive tetravalent selenium.

<Valence Change Step>

An oxidant is added to the selenium-containing wastewater. The wastewater containing the added oxidant is then stirred appropriately, and the selenium is subjected to oxidation over a prescribed period of time. As a result, the selenium having a valence lower than +4 in the wastewater undergoes a change in valence, with the majority of the selenium becoming positive tetravalent selenium.

The oxidant may be selected from among hydrogen peroxide, sodium hypochlorite and ozone. The amount added of the oxidant is set as appropriate in accordance with factors such as the concentration of selenium within the wastewater.

When hydrogen peroxide is used as the oxidant, the amount added of the hydrogen peroxide is typically at least 100 mg/l but not more than 600 mg/l, and is preferably at least 100 mg/l but not more than 400 mg/l. If the amount added of the hydrogen peroxide is too small, then the oxidation of the selenium may not proceed satisfactorily, and selenium having a valence lower than +4, such as negative divalent selenium, may remain in the wastewater. On the other hand, even if an excess of hydrogen peroxide exceeding 600 mg/l is added, the oxidation-reduction potential of the wastewater is unable to be changed to match the amount added of the hydrogen peroxide.

When sodium hypochlorite is used as the oxidant, the amount added of the sodium hypochlorite is typically at least 200 mg/l but not more than 800 mg/l, and is preferably at least 200 mg/l but not more than 500 mg/l. If the amount added of the sodium hypochlorite is too small, then the oxidation of the selenium may not proceed satisfactorily, and selenium having a valence lower than +4 may remain in the wastewater. On the other hand, if sodium hypochlorite is added in an amount exceeding 800 mg/l, then the oxidation-reduction potential of the wastewater tends to become too high. If the oxidation-reduction potential of the wastewater is increased too high, then the oxidation reaction of the selenium is accelerated, and the proportion of the selenium converted to positive hexavalent selenium increases.

In the valence change step, prior to the addition of the oxidant, an iron salt such as ferric chloride is preferably added to the wastewater. The amount added of the ferric chloride is, for example, equivalent to an amount of iron (Fe) of at least 50 mg/l but not more than 1,000 mg/l, and preferably at least 50 mg/l but not more than 200 mg/l.

The timing of the addition of the iron salt is not limited to addition prior to the addition of the oxidant, and may involve addition after the addition of the oxidant.

In the valence change step, the oxidation-reduction potential of the wastewater is controlled to a value within a prescribed range. The oxidation-reduction potential of the wastewater is preferably controlled so that the wastewater becomes a solution with an oxidizing tendency. Specifically, the oxidation-reduction potential of the wastewater is typically at least 200 mV but not more than 1,500 mV, and is preferably at least 200 mV but not more than 1,000 mV. The oxidation-reduction potential of the wastewater can be controlled by adjusting the amounts added of the oxidant and the ferric chloride. If the oxidation-reduction potential of the wastewater is too high, then the proportion of positive hexavalent selenium increases. If the oxidation-reduction potential of the wastewater is too low, then the oxidation of the selenium may not proceed satisfactorily, and ionized selenium having a valence lower than +4 may remain in the wastewater. Positive hexavalent selenium or negative divalent selenium is difficult to remove with a solid-liquid separation treatment, and therefore the selenium removal rate decreases.

<Solid-Liquid Separation Step>

Once the wastewater has been subjected to the valence change step, an appropriate alkali agent is added to convert the wastewater to a neutral solution. Examples of the alkali agent include sodium hydroxide and slaked lime.

Next, a flocculant is added to the wastewater. The flocculant is typically an inorganic flocculant or a combination of an inorganic flocculant and a polymer flocculant. When a combination of an inorganic flocculant and a polymer flocculant is used, the inorganic flocculant is added first, and the polymer flocculant is then added.

Examples of the inorganic flocculant include polyaluminum chloride (PAC), aluminum sulfate and ferric chloride. Examples of the polymer flocculant include anionic polymer flocculants and nonionic polymer flocculants. Specific examples of anionic polymer flocculants include Hishifloc H-305 (manufactured by Mitsubishi Heavy Industries Mechatronics Systems, Ltd.) and Hishifloc HA-510 (manufactured by Mitsubishi Heavy Industries Mechatronics Systems, Ltd.).

Following addition of the flocculant to the wastewater, the wastewater is stirred appropriately to form a floc. Subsequently, the wastewater is left to stand for a prescribed period to allow the floc to settle, and the supernatant is then separated. The floc contains positive tetravalent selenium. Accordingly, by separating and removing the floc, selenium can be removed from the wastewater.

If necessary, the solid-liquid separation step may be performed a number of times.

The method for removing selenium according to the present embodiment may be implemented in combination with steps for removing other toxic substances. For example, a fluorine removal treatment generally requires a flocculation and separation step using a flocculant. The method for removing selenium according to the present embodiment can be used for reducing the concentration of selenium to a level lower than the discharge standard in such a flocculation and separation step. Accordingly, the method for removing selenium according to the present embodiment can be implemented in combination with a fluorine removal treatment. Further, the method for removing selenium according to the present embodiment may also be implemented in combination with a treatment for removing heavy metals such as mercury.

The design basis for the method for removing selenium according to the aforementioned embodiment is outlined below.

<Test 1>

Based on the method for removing selenium of the embodiment described above, selenium was removed from an IGCC.

In an IGCC wastewater treatment facility, generally, the wastewater generated in each step of the IGCC is first collected in a raw water tank, and a treatment for removing toxic substances is then performed. As a result, a water that was obtained by diluting the wastewater from the step which yielded the highest selenium concentration, as determined from the wastewater composition from each step, was used as the raw water.

Hydrogen peroxide ($H_2O_2$, manufactured by Wako Pure Chemical Industries, Ltd.) was used as the oxidant. A combination of polyaluminum chloride (PAC, manufactured by Taki Chemical Co., Ltd.) and Hishifloc H-305 was used as the flocculant. Epofloc (a registered trademark) L-1 (manufactured by Miyoshi Oil & Fat Co., Ltd.) was used as a chelating agent.

Procedure 1: pH Adjustment

Sulfuric acid ($H_2SO_4$) was added to the raw water to adjust the pH to 7, thus obtaining a treated water A.

Procedure 2: Valence Change Step (pH Adjustment/Ferric Chloride Addition/Oxidant Addition/Deaeration)

Sulfuric acid was added to the treated water A to form a solution with a pH of 4 (treated water B). Ferric chloride (an iron salt) and hydrogen peroxide were then added to the treated water B. The amount added of the ferric chloride was within a range from 0 mg/l to 100 mg/l. The amount added of the hydrogen peroxide was within a range from 0 mg/l to 600 mg/l. The solution obtained by subsequently stirring the treated water B for 30 minutes was termed a treated water C.

Procedure 3: First Solid-Liquid Separation Step (Neutralization/Flocculant Addition/Settling/Supernatant Separation)

Sodium hydroxide (NaOH) was added to the treated water C to obtain a solution with a pH of 7 (treated water D). PAC was then added to the treated water D, and the solution obtained upon subsequent stirring for 30 minutes was termed a treated water E. The amount added of PAC was 3,600 mg/l.

Hishifloc H-305 was then added to the treated water E and stirred for 5 minutes. The amount added of the Hishifloc H-305 was 10 mg/l. Subsequently, the treated water E was left to stand for 5 minutes to allow the floc to settle. The supernatant was separated from the treated water E containing the settled floc, thus obtaining a treated water F.

Procedure 4: Second Solid-Liquid Separation Step

The chelating agent was added to the treated water F and stirred for 30 minutes. The amount added of the chelating agent was 40 mg/l. Subsequently, in a similar manner to the first solid-liquid separation step, a floc was formed using NaOH, PAC and Hishifloc H-305, and the floc was then allowed to settle. The supernatant was separated from the treated water F containing the settled floc, thus obtaining a treated water G.

The selenium concentration levels of the raw water, the treated water F and the treated water G were measured. The selenium concentration was measured in accordance with JIS K 0102 67.2.

Table 1 shows the amounts added of the hydrogen peroxide and the ferric chloride, and the selenium concentration levels of the treated water F and the treated water G. The selenium concentration of the raw water was 0.75 mg/l.

TABLE 1

| | Amount added | | Treated water F | Treated water G |
|---|---|---|---|---|
| No. | $H_2O_2$ (mg/l) | $FeCl_3$ (mg-Fe/l) | Se (mg/l) | Se (mg/l) |
| 1 | 100 | 0 | — | 0.075 |
| 2 | 100 | 50 | 0.270 | 0.030 |
| 3 | 100 | 100 | 0.075 | 0.025 |
| 4 | 200 | 100 | 0.089 | 0.036 |
| 5 | 300 | 100 | 0.059 | 0.031 |
| 6 | 600 | 100 | — | 0.023 |
| 7 | 0 | 100 | 0.490 | 0.300 |
| 8 | 0 | 50 | — | 0.320 |

The selenium concentration in the treated water G (No. 1 to No. 6) prepared by adding the oxidant (hydrogen peroxide) to the raw water was not more than 0.1 mg/l. On the other hand, the selenium concentration in the treated water G (No. 7 and No. 8) prepared by adding ferric chloride to the raw water but adding no oxidant was about 0.3 mg/l. The selenium discharge standard based on the Water Pollution Control Act is 0.1 mg/l. The above results confirmed that by treating the raw water by adding an oxidant, the selenium concentration in the treated water G could be reduced to a level lower than the discharge standard.

The selenium concentration of the treated water G (No. 1) to which 100 mg/l of hydrogen peroxide had been added was 0.075 mg/l. The selenium concentration values for the treated water G (No. 2 and No. 3) to which 100 mg/l of hydrogen peroxide and then ferric chloride had been added were 0.03 mg/l and 0.025 mg/l respectively. These results confirmed that by adding not only an oxidant, but also adding ferric chloride, the concentration of selenium contained within the treated water G could be further reduced.

Table 1 indicates that the selenium concentration of the treated water G changed only slightly in accordance with the amounts added of the hydrogen peroxide and the ferric chloride. In contrast, the selenium concentration of the treated water F changed more significantly in accordance with the amounts added of the hydrogen peroxide and the ferric chloride.

Specifically, the selenium concentration of the treated water F (No. 2) in which the amount added of ferric chloride was 50 mg/l was 0.27 mg/l. The selenium concentration values for the treated water F (No. 3 to No. 5) in which the amount added of ferric chloride was 100 mg/l were all less than 0.1 mg/l. These results confirmed that by setting the amount added of the ferric chloride to 100 mg/l, the selenium concentration of the treated water following completion of the first solid-liquid separation step was able to be reduced to a value less than the discharge standard.

The selenium concentration values for the treated water F (No. 3 to No. 5) to which 100 mg/l of ferric chloride had been added tended to decrease as the amount of hydrogen peroxide added was increased.

<Test 2>

Sodium hypochlorite was used as the oxidant. The raw water was treated in a similar manner to Test 1 up to and including the first solid-liquid separation step, thus obtaining a treated water F.

The selenium concentration levels of the raw water and the treated water F were measured. Further, the oxidation-reduction potential (ORP) values of the raw water and the treated water B immediately prior to deaeration were measured. The oxidation-reduction potential was measured using a D-52 apparatus manufactured by Horiba, Ltd.

Table 2 shows the amounts added of the sodium hypochlorite and the ferric chloride, the selenium concentration of the treated water F, and the oxidation-reduction potential of the treated water B immediately prior to deaeration. The raw water had a selenium concentration of 0.71 mg/l, an oxidation-reduction potential of 40 mV, and a pH of 12.8.

TABLE 2

| No. | Amount added | | Treated water F | ORP of treated water B |
|---|---|---|---|---|
| | NaClO (mg/l) | FeCl$_3$ (mg-Fe/l) | Se (mg/l) | (mV) |
| 9 | 220 | 50 | 0.009 | 630 |
| 10 | 220 | 100 | 0.025 | 740 |
| 11 | 440 | 100 | 0.045 | 900 |
| 12 | 660 | 100 | 0.060 | 1100 |

As shown in Table 2, by treating the raw water by adding sodium hypochlorite, the selenium concentration of the treated water F was able to be reduced to a level lower than the discharge standard. Setting the amount added of the sodium hypochlorite to 220 mg/l reduced the selenium concentration of the treated water F to the lowest level.

When the amount added of the sodium hypochlorite was increased, a tendency for an increased selenium concentration in the treated water F was observed. The oxidation-reduction potential of the treated water B also increased as the amount added of the sodium hypochlorite was increased. It is thought that because the oxidation-reduction potential of the treated water B was increased too much, oxidation of the selenium proceeded too far, meaning the amount of positive hexavalent selenium increased, resulting in an increase in the final selenium concentration. Because positive hexavalent selenium cannot be flocculated and separated using a flocculant, it is preferable that the change in the valence of the selenium caused by the oxidation process is stopped at positive tetravalent selenium. Based on these results, it was evident that when oxidizing the selenium, an ideal range exists for the oxidation-reduction potential of the treated water.

(Relationship Between Hydrogen Peroxide and the Oxidation-Reduction Potential)

Using sulfuric acid, the pH of the raw water was adjusted to pH 4. Ferric chloride and hydrogen peroxide were then added to the raw water, and the oxidation-reduction potential was measured. Table 3 shows the amounts added of the ferric chloride and the hydrogen peroxide, and the results of measuring the oxidation-reduction potential.

TABLE 3

| H$_2$O$_2$ (mg/l) | FeCl$_3$ (mg-Fe/l) | ORP (mV) |
|---|---|---|
| 100 | 50 | 409 |
| 580 | 50 | 393 |
| 600 | 100 | 433 |
| 1000 | 50 | 440 |

Based on the results in Table 3, it is evident that when the amount added of hydrogen peroxide was increased from 100 mg/l to 1,000 mg/l, the oxidation-reduction potential of the raw water only increased slightly.

The invention claimed is:

1. A method for removing selenium from a wastewater from a facility that gasifies a coal fuel containing selenium in a reducing atmosphere, the method comprising:
   a valence change step of adding an oxidant to the wastewater containing selenium, and oxidizing selenium having a valence lower than +4 to change the valence of the selenium to +4, and
   a solid-liquid separation step of adding a flocculant to the wastewater, forming a floc containing the selenium for which the valence has been changed in the valence change step, and subjecting the floc to solid-liquid separation,
   wherein the valence change step includes a step of adjusting a pH of the wastewater to 4 before adding the oxidant to the wastewater,
   the solid-liquid separation step includes a step of adjusting a pH of the wastewater to 7 using an alkali agent before adding the flocculant to the wastewater,
   wherein hydrogen peroxide is used as the oxidant in the valence change step and an oxidation-reduction potential of the wastewater is controlled to a value of at least 393 mV but not more than 433 mV so as to change the valence of the selenium to +4, or sodium hypochlorite is used as the oxidant in the valence change step and an oxidation-reduction potential of the wastewater is controlled to a value of at least 630 mV but not more than 900 mV so as to change the valence of the selenium to +4,
   the flocculant comprises an inorganic flocculant and a polymer flocculant, and
   the polymer flocculant is an anionic polymer flocculant or a nonionic polymer flocculant.

2. The method for removing selenium according to claim 1, wherein an iron salt is added to the wastewater in the valence change step.

* * * * *